United States Patent [19]

Chilko et al.

[11] Patent Number: 5,039,462

[45] Date of Patent: Aug. 13, 1991

[54] METHOD AND APPARATUS FOR PRODUCING BIAXIALLY ORIENTED POLYMER SHEET

[75] Inventors: Robert J. Chilko, Lower Burrell; Paul T. Wang, Murrysville, both of Pa.

[73] Assignee: Aluminum Company of America, Pittsburgh, Pa.

[21] Appl. No.: 461,656

[22] Filed: Jan. 8, 1990

[51] Int. Cl.$^5$ .............................................. B29C 43/34
[52] U.S. Cl. .............................. 264/23; 264/25; 264/68; 264/120; 264/235; 264/280; 264/320; 264/323; 425/174.2; 425/371; 425/406
[58] Field of Search ............ 264/323, 280, 120, 290.2, 264/320, 23, 69–72, 25, 68, 235; 425/378.1, 376.1, 381, 461, 466, 174.2, 328, 371, 406

[56] References Cited

U.S. PATENT DOCUMENTS

| | | | |
|---|---|---|---|
| 2,408,627 | 10/1946 | Green . | |
| 3,072,584 | 1/1963 | Karpovich | 425/466 |
| 3,285,442 | 11/1966 | Tigner | 264/70 |
| 3,318,129 | 5/1967 | Gross | 72/199 |
| 3,382,220 | 5/1968 | Bowman, Jr. | 425/378.1 |
| 3,443,277 | 5/1969 | Frielingsdorf | 264/70 |
| 3,494,990 | 2/1970 | Balint | 425/328 |
| 3,523,147 | 8/1970 | Hold et al. | 264/23 |
| 3,620,061 | 11/1971 | Cunningham et al. | 72/199 |
| 3,771,939 | 11/1973 | Barth | 425/385 |
| 3,883,631 | 5/1975 | Murray | 425/380 |
| 3,908,808 | 9/1975 | Busker | 100/35 |
| 4,151,245 | 4/1979 | Susuki | 264/280 |
| 4,379,729 | 4/1983 | Cross | 156/73.6 |
| 4,789,514 | 12/1988 | Lo | 264/280 |
| 4,793,954 | 12/1988 | Lee et al. | 264/23 |
| 4,820,466 | 4/1989 | Zachariades | 264/120 |
| 4,874,657 | 10/1989 | Lo et al. | 428/220 |
| 4,877,393 | 10/1989 | Lo | 425/383 |

FOREIGN PATENT DOCUMENTS

| | | | |
|---|---|---|---|
| 43-28303 | 12/1968 | Japan | 264/23 |
| 60-105513 | 6/1985 | Japan | 425/174.2 |
| 89/10828 | 11/1989 | PCT Int'l Appl. . | |
| 532529 | 5/1977 | U.S.S.R. | 264/23 |
| 2008023A | 5/1979 | United Kingdom | 264/69 |

*Primary Examiner*—Jeffery Thurlow
*Attorney, Agent, or Firm*—William J. O'Rourke; Glenn E. Klepac

[57] ABSTRACT

This invention provides a process for producing biaxially oriented polymer sheet. This process includes the steps of introducing a polymer slab into a deformation zone defined between working surfaces of a set of working tools including a first working tool and an opposed second working tool. The polymer slab is worked in the deformation zone to reduce slab gauge, during which the polymer material being worked flows bi-directionally while the material is not restricted in the lateral direction to produce biaxially oriented polymer sheet. At least the portion of the slab being worked is at a temperature above the glass transition temperature and below the melting temperature of the polymer material. The working surface of at least one working tool in the deformation zone is ultrasonically excited during working of the polymer slab. This invention also provides an apparatus for ultrasonically exciting the working surface of at least one working tool in a deformation zone where a polymer slab is introduced and worked between working surfaces of a set of opposed working tools. The apparatus includes tools for advancing the polymer slab and for working the slab by reducing slab gauge during which the polymer material flows bi-directionally to produce biaxially oriented polymer sheet.

18 Claims, 2 Drawing Sheets

TEMPERATURE RISE DUE TO ULTRASONIC
LOADING AT 50 psi CONTACT PRESSURE

METHOD AND APPARATUS FOR PRODUCING BIAXIALLY ORIENTED POLYMER SHEET

BACKGROUND OF THE INVENTION

1. Field of the Invention

The present invention relates to a process for producing biaxially oriented polymer sheet and an apparatus for performing such process. More particularly, the invention is directed to a process wherein a polymer slab is introduced into a deformation zone and is advanced through the zone while the working face of at least one working tool in the zone is ultrasonically excited. As used herein, the term "polymer" includes polymers selected from the group consisting of polymethyl methacrylate, polyvinyl chloride, polyethylene, polystyrene, polycarbonate, polyamides, polyester such as polyethylene terephthalate, polyarylates, nylons and mixtures thereof.

2. Description of the Art

Biaxially oriented polymers have numerous advantages over unoriented polymers in that they possess higher strength, improved stiffness, increased toughness, and superior thermoformability. Biaxially oriented polymers have been successfully produced by a number of techniques. These techniques include hydrostatic extrusion, such as that disclosed in U.S. Pat. No. 4,282,277, which is a process of using a mandrel in combination with a conical die to form a tubular product. The tubular product is then cut, flattened and annealed.

In order to avoid the expense of first forming a tube and subsequently slitting and flattening the tube to form a biaxially oriented sheet, a twin-belt process has been developed such as that disclosed in U.S. Pat. No. 4,789,514. Such twin-belt process provides substantially uniform strain over the width of the sheet and through the thickness of the sheet. The material of the workpiece, proximate the center portion, is squeezed in a manner to compensate for the friction between the material and the working surface. It is also known that lower pressures are required to produce biaxial orientation by a twin-belt process as compared to a process using stationary flat dies. In actual experiments, pressures of 7,000 psi (492 kg/cm$^2$) were required to form biaxially oriented sheet between flat dies, whereas pressures of only 800 psi (56.2 kg/cm$^2$) were required to form biaxially oriented sheet in a twin-belt machine. Because the flat die machines typically require higher extrusion pressures, they require greater initial capital outlays than twin-belt apparatus.

The use of ultrasonics has been disclosed in the metalworking art. For example, U.S. Pat. No. 3,318,129 discloses a metal rolling process in which ultrasonic vibration is applied to the metal being rolled through the roller to eliminate the need for annealing. U.S. Pat. No. 2,408,627 discloses the use of a vibration generating device attached to an extrusion die. U.S. Pat. No. 4,793,954 discloses the use of ultrasonic vibration in molten thermoplastic shearing operations such as extrusion and injection molding.

Despite significant progress in the area of producing biaxially oriented polymer sheet, there is a need and a demand for further improvement. For instance, the pressure required to process highly frictional materials, such as polyethylene terephthalate, by axial deformation exceeds the pressure limitations of conventional state-of-the-art twin belt processing machinery, which limit is equivalent to about 1500 psi. As will be explained in detail below, the process of the present invention utilizes ultrasonic processing which has the effect of reducing friction to thereby allow the processing of materials, including highly frictional materials, by biaxial deformation.

Accordingly, a new method and apparatus for producing biaxially oriented polymer sheet are desired which combine the use of ultrasonics to further improve the process of producing biaxially oriented polymer sheet.

SUMMARY OF THE INVENTION

This invention may be summarized as providing a process for producing biaxially oriented polymer sheet comprising the steps of introducing a polymer slab into a deformation zone defined between working surfaces of a set of working tools including a first working tool and an opposed second working tool. The polymer slab is advanced through the deformation zone to work the slab by reducing slab gauge, during which the polymer material being worked flows bi-directionally while the material is not restricted in the lateral direction, to produce biaxially oriented polymer sheet. While the polymer slab is advanced, at least the portion of the slab being worked is at a temperature above the glass transition temperature and below the melting temperature of the polymer material. The working surface of at least one working tool in the deformation zone is ultrasonically excited during working of the polymer slab.

This invention is also summarized as providing an apparatus for ultrasonically exciting the working surface of at least one working tool in a deformation zone where a polymer slab is introduced and advanced between working surfaces of a set of opposed working tools. The apparatus includes tools for advancing the polymer slab and for working the slab by reducing slab gauge during which the polymer material flows bi-directionally to produce biaxially oriented polymer sheet.

Among the advantages of this invention is the provision of a method and an apparatus for producing biaxially oriented polymer sheet which provide alternatives to the known twin-belt process.

Another advantage of this invention is a significant reduction in boundary friction between working tools and the polymer slab during deformation of the polymer slab.

A further advantage of this invention is that preheat requirements for polymer slabs may be reduced since a degree of heat is generated when the polymer slab is exposed to ultrasonic energy in this invention.

A feature of this invention is that polymer slabs may be formed into biaxially oriented polymer sheet in a process which requires less pressure to form the sheet due to the combined effects of increased temperature and material composition relaxation caused by exposing the polymer being worked to ultrasonic energy.

An objective of this invention is to provide a unique approach to the production of biaxially oriented polymer sheet involving the use of ultrasonic energy in the deformation zone.

Another feature of this invention is that biaxially oriented polymer sheet material produced by the process of this invention may exhibit improved or enhanced properties, particularly in the areas of improved strength and homogeneity.

These and other advantages and objectives of the invention will be more thoroughly understood and appreciated with reference to the following description and the accompanying drawings.

DETAILED DESCRIPTION

Figure 1:
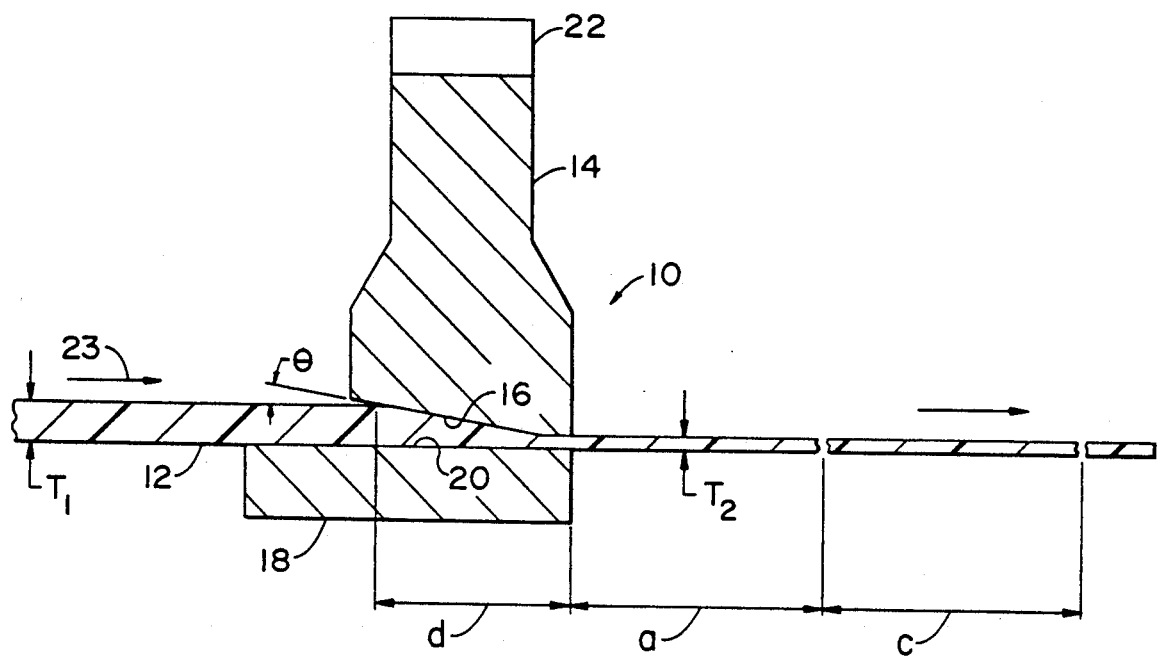
FIG. 1 is a cross-sectional view of an apparatus of the present invention showing working tools for forming biaxially oriented polymer sheet in a deformation zone.

Referring particularly to the drawings, FIG. 1 illustrates, in cross-section, an apparatus 10 for producing biaxially oriented polymer sheet 12. The apparatus shown in FIG. 1 includes a first working tool 14 having a first working face 16. The apparatus 10 further includes a second working tool 18, having a second working surface 20, which is generally opposite the first working tool 14. The opposed tools 14 and 18 are disposed such that a polymer sheet advanced therethrough is deformed within a deformation zone d therebetween.

In the process of this invention, a polymer slab is introduced into the deformation zone d between working faces 16 and 20 of the opposed tools 14 and 18. The polymer materials may be selected from the group consisting of polymethyl methacrylate, polyvinyl chloride, polyethylene, polystyrene, polycarbonate, polyester such as polyethylene terephthalate, polyamide which includes nylons and amorphous polyamides, polyarylate, and mixtures thereof. It will be appreciated that the working faces 16 and 20 in the deformation zone may be lubricated such as with mineral oil, silicone oil, synthetic branched chain polyolefins or the like.

Although the drawings illustrate a continuous, or semicontinuous, process for working a polymer that is advanced between a platen type tool 18 and an opposed tool 16, other working tools are contemplated by this invention. For example, tools for receiving and working polymer articles in a batch type process are contemplated. Also, the use of pairs of opposed twin-belts, and the use of rollers, are comprehended by the present invention. By working it is meant that the material is reduced in thickness due to application of pressure.

The polymer slab may be introduced into the deformation zone d by a variety of methods. The method of delivering a polymer slab into the deformation zone is not critical to the process of the present invention. For example, in a batch process a polymer slab may be placed between working tools. Alternatively, the slab may be delivered to the deformation zone and advanced therethrough on a conveyor, a roller table or other apparatus.

Prior to or coincident with the introduction of the polymer into the deformation zone d, the temperature of the polymer to be worked in the deformation zone is above the glass transition temperature and below the melting temperature of the polymer material. It is noted that the polymer material worked in accordance with the present invention is, therefore, in a solid state condition, not a molten condition. Such temperature range is typically attained by passing the polymer slab through a preheat furnace. Alternatively, the temperature of the polymer slab may be raised, in whole or in part, by allowing sufficient dwell time on or in heated working tools.

Figure 2:
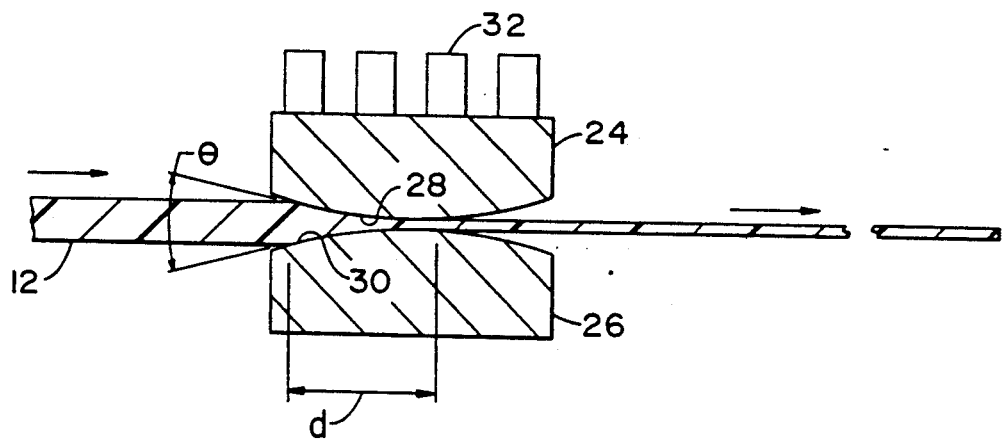
FIG. 2 is a cross-sectional view of an alternative embodiment of the present invention showing working tools for forming biaxially oriented polymer sheet in a deformation zone.
Figure 3:
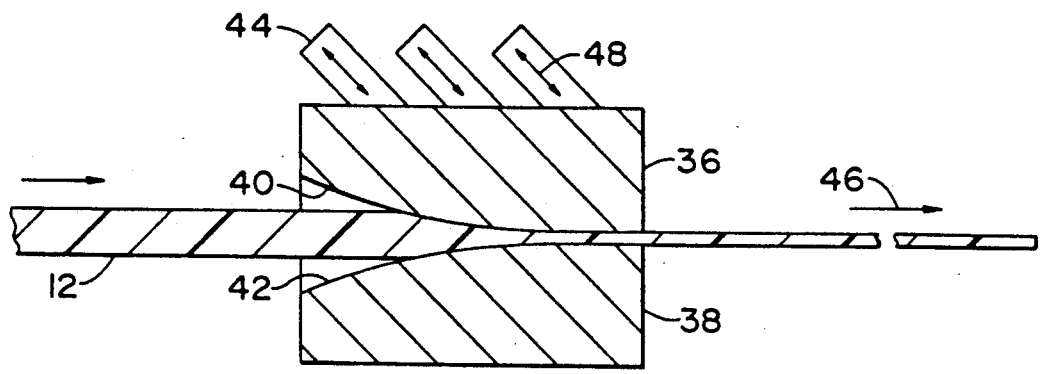
FIG. 3 is a cross-sectional view of another alternative embodiment of the present invention showing working tools for forming biaxially oriented polymer sheet in a deformation zone.

The two opposed working faces 16 and 20 define a deformation zone d where the preheated polymer slab material is introduced. The material is pushed and/or pulled into and through the deformation zone. The working faces converge normal to the direction of travel, indicated by arrow 22 in FIG. 1. As shown in FIG. 1, the working face 16 of the first working tool 14 may be inclined, preferably at an angle of less than about 6°, from the axis of travel indicated by the arrow 22 in FIG. 1. More preferably, the inclination angle a is from about 2° to about 5°. The inclination angle a can be formed with one of the working faces being disposed parallel to the direction of travel and the other face being inclined, or with the combined angle formed by the first and second working faces being within the preferred range as shown in FIG. 2 and 3 and discussed below. The slope of the inclined face of the working tool will be a function of the amount of reduction in thickness that is to be achieved from entry to exit as the material is advanced.

The polymer slab 12 is advanced through the deformation zone d, such as at a rate of about 3 to 10, and preferably 2 to 5, feet per minute. The slab is worked such that gauge reduction occurs, such as from initial or entry thickness $T_1$ to final or exit thickness $T_2$. During the working process the polymer slab 12 typically undergoes lateral spread. Thickness reduction attainable by this invention is typically about 5 times, while lateral spread is about 2.3 times. This means that a polymer slab may be reduced in thickness from, for example, 0.75 inch to 0.15 inch, and may spread in area, i.e., width and length, by a factor of 2.3 times the original width and length dimension. Lateral spread is the bi-directional flow of polymer material while the polymer is not restricted from such flow, which results in the production of biaxially oriented polymer sheet. It will be appreciated by those skilled in the art that the edge portions of the biaxially oriented polymer sheet produced in accordance with this invention may require edge trimming, depending on the use of the material.

While the polymer slab is advanced through the opposed tools, the working surface of at least one of the working tools is ultrasonically excited. As shown in FIG. 1, an ultrasonic transducer 22 or horn, which is attached to the first working tool 14, is excited. The frequency and the amplitude of the transducer 22 may be at any rate which those skilled in the art determine to have a beneficial effect in working polymers according to this invention. A preferred amplitude of about 0.001 inch, and a preferred frequency of 20,000 strokes (Hz) per second, have been found to be particularly useful and beneficial. It should be noted, however, that amplitudes less than 0.001 inch, such as 0.0005 or even as low as 0.00025 inch, may be applicable to the process of this invention. Likewise, amplitudes greater than 0.001 inch, such as 0.002 or 0.003 inch, may be applicable to the process of this invention. In an alternative embodiment, the amplitude may be adjustable, such as through a 0.0005 inch to 0.003 inch range.

A preferred frequency for the transducer 22 is 20,000 strokes (Hz) per second, although lower or higher frequencies may be employed. For example, frequencies on the order of 10,000 strokes per second or 30,000 strokes per second may be employed in operating a transducer in accordance with this invention. In an alternative embodiment, it may be appropriate to constantly adjust the frequency, sometimes called sweeping the frequency, during the polymer deformation process. For example, it is common to establish an ideal frequency for each working tool based on such factors as tool composition and tool configuration. This process of setting the frequency is known as tuning the transducer. With planar working faces on the tools, the ideal frequency may be the same across the entire tool face. However, the ideal frequency may vary for tools having nonplanar working faces. There are a number of approaches to minimizing any adverse effects attributable to such frequency variation in such cases. A first approach is to utilize a midpoint or midlevel frequency between the highest and lowest calculated ideal frequencies and use that midlevel frequency constantly. This approach may be acceptable in instances where the variations between high and low ideal frequency values are minimal, typically in instances where the polymer deformation process is not adversely affected by operating at a slightly detuned frequency. A second approach is to utilize a series of segmented working tools, with each segment separately excited at its own ideal frequency. When such tool segments are utilized, the tools are segmented along a path coincident with the direction of ultrasonic excitement in order that the segments are free to pulse substantially independent of interference from other segments. Also, segmented tools should be aligned close enough that polymer material does not flow between adjacent segments during working. A third approach is to utilize one transducer with variable frequency and during polymer deformation continuously adjust the frequency through the range of ideal frequencies, thus maximizing the frequency effect along various points on the nonplanar working face as a polymer slab is worked in the process of this invention.

Such ultrasonic energy may be obtained from one or a series of transducers, such as 600 watt transducers, 800 watt transducers, or 4 kilowatt transducers, as may be required to transmit ultrasonic energy to the working face 16 of the tool 14 across the width of the polymer slab 12 within the deformation zone d where the polymer slab is being worked. In preferred embodiments, the transducer may be piezoelectric or magnetostrictive. It will be appreciated by those skilled in the art that companion generators are available to power such transducers, and, as discussed above, that the working tools may be segmented to accommodate the particular geometry of a transducer.

In a preferred embodiment, a second transducer or second series of transducers may be provided on the second working tool 18. Such embodiment provides ultrasonic excitation at both, opposed working faces 16 and 20 within the deformation zone d. The use of transducers on both the first working tool 14 and the second working tool 18 may be desirable in certain instances. For example, if the working face of the second tool is planar, while the first tool has a 6° inclined working face, the effects of ideal frequency variation along the 6° inclined nonplanar working face may be adverse. Such adverse effects may be minimized by providing two opposed working faces, each inclined at a 3° angle. Such arrangement still provides a 6° working angle for the polymer, yet reduces the adverse effects of ideal frequency variation along the nonplanar working face by reducing the nonplanar deviation, i.e., inclination angle. It has been found that such effects are very minimal for working faces having inclination angles of less than about 3° and extending for a length of less than about six inches at such angle in the direction of travel of the polymer slab.

In another embodiment, as illustrated in FIG. 2, a polymer slab 12 is introduced between a first working tool 24 and a second working tool 26. The tools 24 and 26 have opposed curvilinear working faces 28 and 30, respectively. At the entry side of the tools an inclination angle a of less than about 6° is provided. In this embodiment a series of ultrasonic transducers 32 is provided, with the transducers spaced along the longitudinal direction of travel to assure that ultrasonic energy is transmitted to the working face 28 through the deformation zone d. It will be understood that a transducer or series of transducers may be provided on the second working tool 26 in another embodiment of this invention. In another embodiment of this invention, the working tools 24 and 26 with curvilinear working faces 28 and 30 may be rotated or rocked toward and away from the direction of travel to superimpose a mechanical pressing force against the polymer material in addition to the reduction forces otherwise occurring within the deformation zone d.

It was mentioned above that the temperature of the polymer slab should be above the glass transition temperature and below the melting temperature of the polymer while the slab is being worked. It has been found that the use of ultrasonic transducers in the process of this invention produces heat. Therefore, the preheat requirements for the polymer slab are reduced because the polymer slab will experience a degree of heat generation when exposed to the ultrasonic energy. In prior art processes, such as the twin-belt process, without ultrasonic excitation, for producing biaxially oriented polypropylene, the workpiece was typically heated to about 155° C. In the present invention, preheat of polypropylene to 100° C. has been found to be adequate, since the remaining required heat of the polymer may be generated by exposing the 100° C. polypropylene to ultrasonic energy for approximately one minute under a load of about 300 psi. In a preferred embodiment the working tool or tools may be heated or cooled to optimize temperature.

Figure 4:
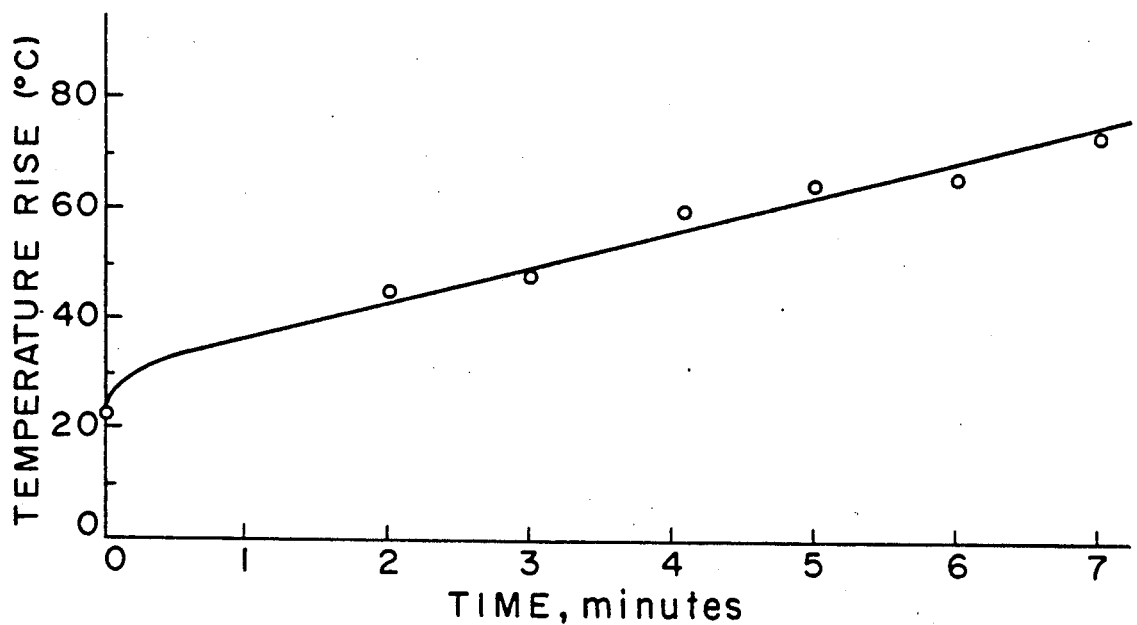
FIG. 4 is a graph illustrating temperature rise of a polymer sheet due to contact pressure loading in the presence of ultrasonic energy.

The temperature rise due to ultrasonics increases with exposure time. FIG. 4 illustrates temperature rise in degrees Centigrade that is attributed to loading of a polymer slab at a stable contact pressure of 50 psi. As illustrated, the slab temperature rises from ambient temperature of 23.7° C. to a temperature of 73.7° C. as loading time increases from zero to seven minutes. This heat buildup is attributed to molecular damping occurring inside the polymer sheet. The heat rises at a substantially steady rate of about 10° C. per minute. It will be appreciated that the temperature rise increases not only with loading time, but also with loading pressure. For example, the temperature of a specimen loaded at 300 psi is increased at a rate of about 16–20° C. per minute, from ambient to about 102° C. in about seven minutes. In instances where shorter processing times are desired, such as one minute, higher pressures could be employed. It will be appreciated that the entry temperature and processing speed through the deformation zone of the present invention should be optimized to maximize the internal heating benefit. In typical processing situations, the processing advantage for solid state deformation of polypropylene could be 20° to 40° C. below the normal processing temperature of about 155° C.

In the process of ultrasonic excitation of the working face of the polymer sheet forming apparatus of this invention, the working face moves toward and away from the polymer slab being worked. Such movement is typically on the order of less than 0.003 inch of amplitude, and is typically at a frequency of more than about 10,000 strokes per second. Preferred amplitude is 0.001 inch, and preferred frequency is 20,000 strokes per second. Such ultrasonic energy which continuously vibrates the working surface has the effect of reducing friction. Such friction reduction is the result of the combined effects of the increased temperature of the polymer slab, relaxation of the heated polymer due to acoustical coupling and exposure to the ultrasonic pulse, and the actual reduction in boundary friction which results with each pulse. These combined effects also allow the polymer to be formed with less load when compared to prior art devices. For example, a load on the order of 400 pounds per square inch (psi) is considered necessary with prior art processes to work a polypropylene slab at 145° C. to the same extent as a 300 psi load may work a 145° C. polypropylene slab in the process of the present invention.

Thus, the present invention may reduce deformation load requirements by about 25% over prior art requirements. This reduction in pressure requirements is significant in that prior art twin-belt polymer sheet forming devices have a practical contact pressure load limit of about 1,500 psi. Therefore, the present invention may be employed to produce biaxially oriented polymer sheet from high strength polymeric materials, such as polyester, which may require high contact pressure loads, sometimes in excess of 1,500 psi.

In another embodiment illustrated in FIG. 3 a polymer slab 12 is worked between two opposed tools, an upper tool 36 and a lower tool 38, having working faces 40 and 42, respectively, thereon. The upper tool 36 is provided with a series of ultrasonic transducers 44. In this embodiment, the transducers 44 may be inclined in the direction of travel of the polymer slab 12 as indicated by arrow 46 in FIG. 3. By inclining the transducers in the direction of slab travel, the ultrasonic energy is generated at such angle as shown by arrows 48 in FIG. 3. Such angularly generated pulse is delivered or transmitted to the polymer slab 12 generally at such an angle. By exerting such angular dynamic pulse against the polymer slab 12, slab movement in the direction of slab travel is enhanced. Such angular inclination of the ultrasonic energy, therefore, acts to further reduce boundary friction effects during the production of biaxially oriented polymer sheet by this invention.

As is also shown in the embodiment of FIG. 1, the polymer sheet 12 may pass from the deformation zone d through an annealing zone a. In a preferred embodiment the material, after deformation, is maintained under load, such as with opposed belts and is heated, such as with platens, which load and temperature are less than that of the deformation zone d. Therefore, as the load is reduced and as the polymer sheet 12 exits the deformation zone d, material relaxation begins to occur. As further shown in FIG. 1, the material 12 passes from an annealing zone a through a cooling zone c. A degree of annealing typically occurs within the working tools. If the anneal is not sufficient within the working tools, it may be necessary to pass the material through a separate annealing zone to assure dimensional stability of the polymer sheet, to reduce internal stresses, and, perhaps, to increase the impact properties of the sheet. An exemplary annealing zone may comprise a chamber in which heat is delivered and circulated, such as with heating fans. If the polymer sheet is amorphous, such as amorphous polymethyl methacrylate, a separate anneal may be necessary to prevent springback of the polymer. If the polymer sheet is crystalline or semicrystalline, a separate anneal is typically not required because the material is already stable. The material may be held under load through at least a portion of the cooling zone c. Cooling means, such as fans or cooling fluids, may be employed to reduce the temperature of the polymer material below the glass transition temperature of the polymer. Cooling may also be accomplished through the use of single or twin belts which act to withdraw heat from the polymer sheet passing thereon or therethrough.

EXAMPLE

A 200 watt transducer assembly was installed to a top platen of a 12 ton press. The transducer test conditions included a frequency of 20 KHz and an amplitude of 0.001 inch. The press was a manually controlled hydraulic press with a calibrated gauge to 500 pounds maximum capacity. The bottom platen was heated with internal heating cartridges.

Polypropylene, specifically Himont 6823 polypropylene, was chosen as an exemplary polymer sample. Sample size was 0.5 inch diameter and 0.5 inch in length. The sample at ambient temperature of about 22° C. was placed between working tools in which the bottom platen was heated to 150° C. The sample was heated to a temperature of 96° C. and a load of 100 psi was applied with ultrasonics for five minutes. Under this load and in the presence of ultrasonics the sample temperature rose to 130° C. Then the load was raised to 200 psi for two minutes with ultrasonics, and the temperature rose to 146° C.

Then the load was raised to 300 psi for one minute with ultrasonics, and the temperature was observed to be 145° C. In this example a slight amount of melt surface was observed at an edge portion after the 300 psi loading. The final length of the sample was reduced from 0.5 inch to 0.196 inch as a result of this ultrasonic polymer working process. Based on the height reduction during such ultrasonic loading, it can be concluded that relaxation response occurred similar to that of metal which occurs at creep temperature. The results indicate a lowering of flow stress, instantaneous relaxation during deformation, and internal heating due to molecular vibration in the practice of the present invention.

In a comparative test, ultrasonics were used only to heat a specimen from 60° C. to 101° C. Once the specimen reached a 101° C. temperature, the ultrasonic transducer was inactivated. A load of 300 psi was applied for two minutes. The resultant sample length was reduced from 0.5 inch to 0.385 inch, and the final temperature was 105° C.

It has been found that the properties of the biaxially oriented polymer sheet produced by this invention may be enhanced over the properties of polymer sheet produced by alternative processes. In particular, the impact strength and optical quality of the material have been found to increase. Also, the material tends to exhibit more uniformity in density and other properties due to processing in the ultrasonic environment of the present invention. In one example, biaxially oriented polymethyl methacrylate formed by the present invention is less brittle than biaxially oriented polymethyl methacrylate formed by other processes.

What is believed to be the best mode of the invention has been described above. It will be apparent to those skilled in the art that numerous variations of the illustrated details may be made without departing from the scope of this invention.

We claim:

1. A solid state process for producing biaxially oriented polymer sheet comprising the steps of:
   introducing a slab of polymer material into a deformation zone between working surfaces of a set of working tools selected from the group consisting of platen type tools and opposed twin belts, said set including a first working tool and an opposed second working tool,
   working the slab between the opposed tools by reducing the slab gauge wherein polymer slab material flows substantially simultaneously bi-directionally while laterally unrestricted to produce biaxially oriented polymer sheet,
   maintaining the slab that is being worked in the deformation zone at a temperature above the glass transition temperature of the polymer material and below the melting temperature of the polymer material, and
   ultrasonically exciting at least one working tool in the deformation zone during working of the slab.

2. A process as set forth in claim 1 wherein the polymer material is a thermoplastic polymer selected from the group consisting of polymethyl methacrylate, polyvinyl chloride, polyethylene, polystyrene, polycarbonate, polyester, polyamide, polyarylate, polypropylene, and mixtures thereof.

3. A process as set forth in claim 1 wherein the slab is continuously advanced through the deformation zone.

4. A process as set forth in claim 1 further comprising the step of heating at least one working tool to a temperature above the glass transition temperature and below the melting temperature of the polymer material.

5. A process as set forth in claim 3 further comprising the step of passing the worked polymer material through an annealing zone immediately downstream of the deformation zone wherein the polymer material is retained at an elevated temperature for a time sufficient to reduce internal stresses and insure dimensional stability of the worked biaxially oriented polymer sheet.

6. A process as set forth in claim 3 further comprising the step of reducing the temperature of the worked material below the glass transition temperature of the polymer material in a cooling zone downstream from the deformation zone.

7. A solid state process for producing biaxially oriented polymer sheet comprising a thermoplastic polymer selected from the group consisting of polymethyl methacrylate, polyvinyl chloride, polyethylene, polystyrene, polycarbonate, polyester, polyamide, polyarylate, polypropylene, and mixtures thereof, comprising the steps of:
   heating a slab of polymer material to a temperature above the glass transition temperature of the polymer material and below the melting temperature of the polymer material,
   while maintaining such temperature, working the polymer slab in a deformation zone between opposed first and second working tools, said tools selected from the group consisting of platen type tools and opposed twin belts, where the heated polymer slab is exposed to a pressure between said tools of at least 100 pounds per square inch, and is thereby substantially simultaneously elongated longitudinally, spread laterally and reduced in thickness,
   continuously advancing the polymer material through the deformation zone, and
   while the polymer material is in the deformation zone, ultrasonically exciting at least one working tool to impart vibration having an amplitude less than 0.003 inch and a frequency greater than 10,000 cycles per second to the working face of said ultrasonically excited working tool.

8. An apparatus for producing biaxially oriented polymer sheet comprising:
   a first working tool having a first working face,
   a second working tool having a second working face, disposed opposite said first working tool, said working tools selected from the group consisting of platen type tools and opposed twin belts,
   means for heating a polymer sheet to a temperature above the glass transition temperature and below the melting temperature of the polymer,
   means for introducing a polymer sheet into a deformation zone defined between working faces of the first and second working tools,
   means for exerting pressure against the heated polymer material in the deformation zone sufficient to reduce the gauge of the polymer, longitudinally elongate the polymer and laterally spread the polymer substantially simultaneously, and
   means for ultrasonically exciting at least one working tool.

9. An apparatus as set forth in claim 8 further comprising means for substantially continuously advancing the polymer sheet through the deformation zone.

10. An apparatus as set forth in claim 8 wherein the ultrasonic exciting means comprises at least one transducer.

11. An apparatus as set forth in claim 10 wherein the transducer generates ultrasonic vibration at an amplitude less than 0.003 inch and a frequency in excess of 10,000 cycles per second.

12. An apparatus as set forth in claim 8 wherein the ultrasonic exciting means comprises a series of transducers.

13. An apparatus as set forth in claim 12 wherein the series of transducers are inclined in a direction toward the direction of travel of the polymer sheet.

14. An apparatus as set forth in claim 9 wherein the polymer sheet is introduced into the deformation zone at a location where the first working face and the opposed second working face form an inclination angle of less than about 10°.

15. An apparatus as set forth in claim 10 wherein the transducer generates ultrasonic vibration at a frequency which is adjustable within the range of from about 10,000 cycles per second to about 30,000 cycles per second.

16. An apparatus as set forth in claim 8 wherein at least one working tool comprises a series of segments with each segment ultrasonically excited independent of the other segments.

17. An apparatus as set forth in claim 8 wherein at least one working face is curvilinear.

18. An apparatus as set forth in claim 17 wherein the curvilinear working face is rotatable toward and away from the direction of travel to impose a mechanical force against the polymer sheet.

* * * * *